Nov. 30, 1965 E. G. PLATT ETAL 3,221,104

ELECTRONIC SWITCHING TELEPHONE SYSTEM

Filed Oct. 25, 1961

INVENTORS
E. R. HASKINS
E. G. PLATT
J. F. DUNLAP

BY [signature]

ATTORNEY

United States Patent Office 3,221,104

Patented Nov. 30, 1965

3,221,104

ELECTRONIC SWITCHING TELEPHONE SYSTEM

Eric G. Platt, Oaklawn, Edward R. Haskins, Lockport, and Joseph F. Dunlap, Oak Park, Ill., assignors to International Telephone and Telegraph Corporation, New York, N.Y., a corporation of Maryland Filed Oct. 25, 1961, Ser. No. 147,532
24 Claims. (Cl. 179—18)

This invention relates to electronic switching telephone systems and more particularly to controls for crosspoint matrices featuring randomly selected crosspoints. The invention is an improvement over two co-pending applications, each of which is entitled, "Electronic Switching Telephone System." A first application, Serial No. 17,003, was filed March 23, 1960 by Virgle E. Porter, (which by way of continuation application Serial No. 389,826 filed August 10, 1964 has become U.S. Patent No. 3,204,044, granted August 31, 1965) and a second application, Serial No. 113,178, was filed May 29, 1961, by Seeman and Haskins. Both applications are assigned to the assignee of this invention.

Recently much attention has been given to the development of electronic switching telephone systems. There remains, however, much room for improvement of such systems. For example, one type of these systems incorporates matrices designed for use in "end-marked" cascaded switching networks. Here the ends of a desired switching path are marked electrically and electronic switch crosspoints in the matrices complete circuits which fan-out from the marked ends toward the middle of the matrices. When two of the fanning out circuits collide in what is known as a matching stage, a switching path is completed between the two end-marked points. Thereafter, all electronic switches in other of the fanning out circuits are released. The trouble is that the electronic switch at the end point must carry an unduly heavy current as the fanning out paths multiply.

To avoid this heavy current, complex marker control circuitry has been used to guide the specific desired path through the matrices. This marker system eliminates the fanning out circuits and, therefore, the heavy current. Unfortunately, however, these marker circuits are extremely complex and expensive.

Another way to prevent excessive fan-out current at end points is to use capacitors to provide most of the current required for switching inside the matrix. These matrices have included electronic crosspoint switches which turn "on" and "off" in a completely random manner until a path finds its way through the matrix. While this random path matrix is a vast improvement over the marker type system, the very randomness of the switch selection leaves room for improvement.

Accordingly, an object of this invention is to provide new and improved electronic switching telephone systems. In this connection, an object is to provide for a completely random selection of crosspoint switches while establishing a degree of order in the switching search. Another object is to guide switching paths to a degree without requiring expensive markers for selecting a specific path through the matrices.

Another object is to provide end-marked electronic switching matrices having self-selecting crosspoints which avoid fan-out current problems and yet do not require expensive control circuitry. Moreover, an object is to overcome the problems of uncontrolled random selection of crosspoint switches without introducing marginal conditions which may change as components age. Consequently, an object is to provide end-marked matrices for extending self-seeking paths through electronic switch crosspoints in an orderly manner under the control of positively acting switching elements.

Still another object is to provide rugged and reliable telephone switching devices which use electronic components. A related object is to provide electronic networks using readily available, low cost switching devices.

In accordance with one aspect of this invention, an electronic switching matrix is formed of first and second (or horizontal and vertical) multiples arranged to provide intersecting crosspoints. A PNPN diode crosspoint switch connects the intersecting multiples at each crosspoint. Thus, the intersecting multiples are electrically joined when the associated diodes are switched "on" and electrically isolated when the diodes are switched "off."

A plurality of these matrices are cascaded to provide an automatic switching system. When a first marking is applied to a multiple in one matrix and a second marking is simultaneously applied to a multiple in another matrix, a switching search is made over a plurality of self-seeking paths extended through the cascaded matrices via randomly selected crosspoints. Unfortunately, however, many of these self-seeking paths do not extend to the second marked multiples, but are dead-end paths. Therefore, the invention contemplates inhibiting all of the dead-end paths to preclude useless searching over such dead-end paths. This inhibition results from the circuit configuration of a pre-wired pattern of connections extending from circuits at the destinations of the self-seeking paths to various multiples in the matrix.

The term "inhibiting," of course, refers to the blocking of a connection. One could just as well take an opposite view and use the term "allotting" to refer to the enabling of a connection. One term is the negative of the other; the circuit effect is the same, at least as used herein.

The above mentioned and other features and objects of this invention and the manner of obtaining them will become more apparent, and the invention itself will be best understood by making reference to the following description of an embodiment of the invention taken in conjunction with the accompanying drawings wherein.

Figures 1, 2:
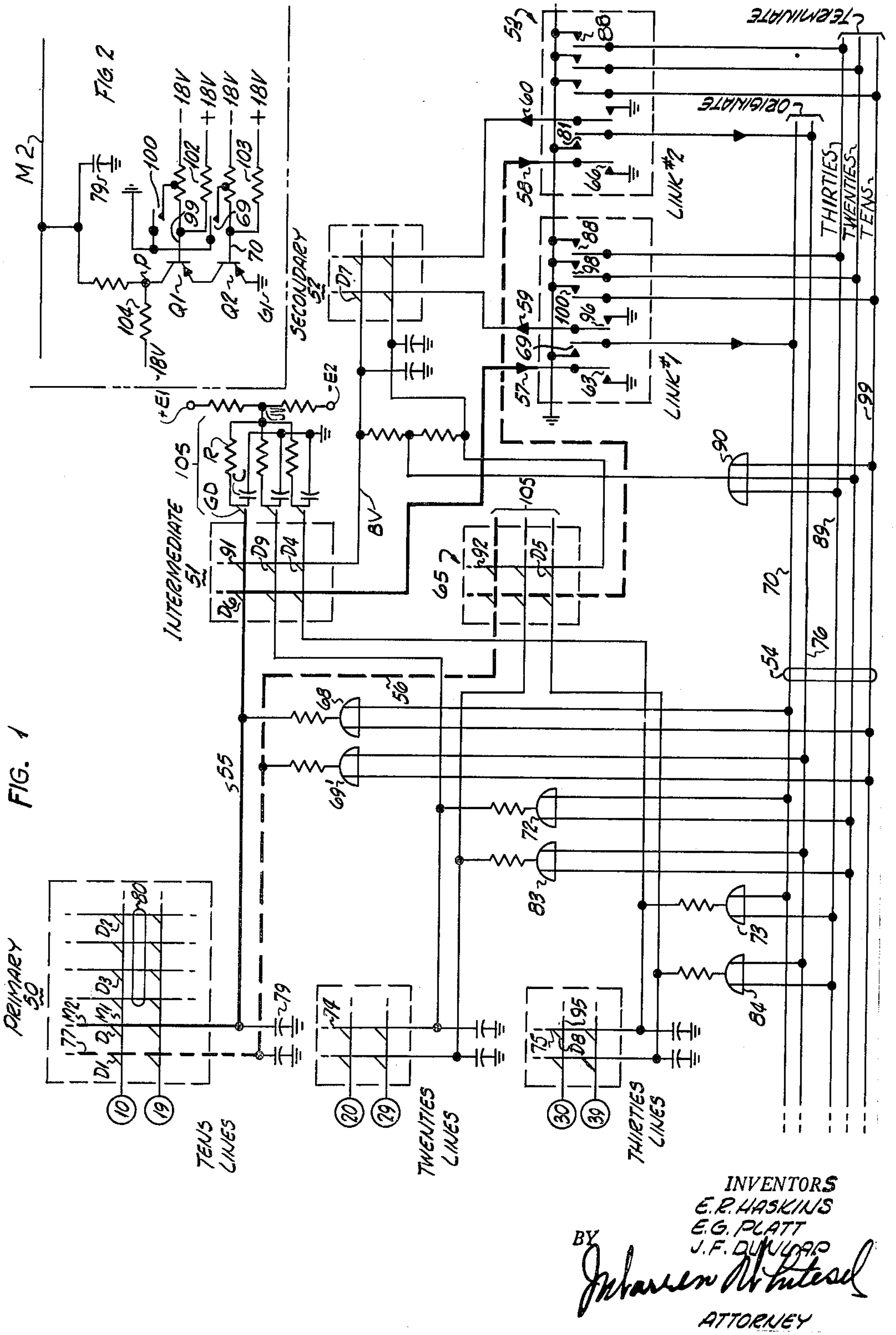
FIG. 1 shows a cascaded series of electronic switching matrices.
FIG. 2 shows a schematic circuit diagram of one exemplary "OR" gate for inhibiting dead-end switching paths when both transistors are switched "on."

FIGURE 1 shows a plurality of cascaded matrices or switching arrays arranged to give automatic telephone service. The figure includes a plurality of subscriber lines arranged in groups of tens, i.e. a first group of ten subscriber lines are numbered 10–19, a second group of ten subscriber lines are numbered 20, 29 and a third group 30–39. Other lines may, of course, be added. Also, the groups may be enlarged or reduced in size to include a greater or lesser number of lines per switching stage. Three cascaded stages of switching matrices or switching arrays 50–52 are here designated "primary," "intermediate," and "secondary." The switching technique applies equally well, however, to five, seven, nine, etc. matrices or switching stage arrays. A number of link circuits 53 control the extension of calls between subscriber lines and provide necessary or desirable call functions such as: dial tone, busy tone, conversation timing, or the like. A number of common buses 54 interconnect the links and matrices to transmit matrix inhibiting signals.

To request a switching path through these cascaded matrices, one end of the desired path is marked from a subscriber line, and the other end is marked from an allotted link circuit. For example, a calling subscriber at station 10 may remove a receiver or handset from a hook switch and cause an associated line circuit to mark multiple M1. A link allotter may close contacts to mark an inlet to link #1. The path will be extended through the matrices in a one-way direction (i.e. from the lines toward the links).

Each matrix includes first and second (or horizontal and vertical) multiples, two of which are shown at M1, M2 respectively. These multiples (which may be conductor busses) are arranged to provide a number of intersecting crosspoints, one of which is shown at D. At each crospoint, an electronic switch such as a PNPN diode, for example, is connected between the intersecting multiples. Thus, when the switch is turned "on," the intersecting multiples are electrically connected, and when the switch it turned "off," the intersecting multiples are electrically isolated from each other.

These electronic switches turn "on" or fire when a voltage in excess of a "firing" potential is applied across their terminals. In greater detail the vertical multiples are biased by a first or common reference potential, about which more will be said later. Therefore, a crosspoint diode switch fires when a horizontal multiple is marked by a second potential which exceeds a firing potential relative to the vertical marking or common reference potential. After a crosspoint fires, the marking potential on the horizontal multiple charges a capacitor connected to the intersecting vertical multiple. When the capacitor charges sufficiently, a firing voltage appears on a horizontal multiple of the next cascaded matrix. Thus, the marking potential is passed on step-by-step to each succeeding cascaded matrix where diodes fire in a similar manner.

Actually, the marked horizontal multiple will have many intersecting vertical multiples (as exemplified in the uppermost primary matrix of FIG. 1). Thus, if all vertical multiples are marked by a common reference potential, all diodes connected to the marked horizontal multiple should fire simultaneously. This pre-supposes, however, that all diodes have the same characteristics, a fact which in reality is not so. Actually, one diode will almost certainly fire first. Then, the common reference potential on the vertical multiple lowers the marking potential on the horizontal multiple while the capacitor charges. This lowered potential prevents other diodes connected to the horizontal multiple from firing. The charging current through the fired diode to the capacitor holds the diode "on." If the charging current is replaced by current over a completed with from subscriber line to an allotted link, the fired diode stays "on." If not, the diode starves for want of current and switches "off." This is due to PNPN diode characteristics. After the diode switches "off," the potential on the charged capacitor is a reverse bias potential which holds that diode "off" momentarily to allow another diode connected to the marked horizontal to switch "on." Thus, diodes switch "on" and "off" in a random manner until a self-seeking path finds its way through the cascaded matrices, all of this is explained in detail in the co-pending Porter application.

Opon reflection, it will be apparent that the self-seeking path may include many combinations of diodes scattered throughout the cascaded matrices. In view of the randomness of the diode selection, there is a good chance that some possible diode firings will be in useless dead-end paths with respect to any two marked end points and other diode firings will be useful paths which actually do extend between these end points.

In greater detail, by an inspection of the drawings it will be seen that each subscriber line connects to a horizontal multiple in a primary matrix. For example, line 10 connects to multiple M1. Each vertical multiple in a primary matrix connects to a horizontal multiple in an intermediate matrix, and some vertical multiples in the intermediate matrices connect to link inputs 57, 58. The link outputs 59, 60 connect to vertical multiples in a secondary matrix, and the horizontal multiples of the secondary matrix connect to other vertical multiples in the intermediate matrices. Also, by inspection, it will be seen that the lines 10–19 have access to link #1 via heavily inked, solid line switch path 55 and to link #2 via heavily inked, dashed line switch path 56. Thus, switch path 55 is a dead-end path for calls from lines 10–19 to link #2, and switch path 56 is a dead-end path for calls from lines 10–19 to link #1. Similar paths may be traced from other groups of subscriber lines to the link circuits and from link outputs 59, 60 to subscriber lines. Of course, these showings are exemplary only. Traffic studies will indicate the required number and size of matrices, and the number of switching paths required. Again the point is that a first plurality of possible paths may be extended between any two points and a second plurality of paths dead-end with regard to the same two points. That is, the second plurality of paths may be extended from one of the two points toward but not to the other of the two points.

In carrying out the invention, means are provided for inhibiting the search over all switching paths which represent a dead-end with respect to two marked switching points. This inhibiting function is under control of the link selected by the allotter to complete the next call. However, as will become more apparent, the inhibiting pattern results from factory wiring connections made at the time the switching system is built. There is no need for a marker circuit, as such. Therefore, expensive control circuits are not required and the advantages of extending self-seeking paths through randomly selected crosspoints is preserved. To illustrate this operation, consider what happens when a subscriber station, such as 10, goes off-hook and the potential on horizontal multiple M1 rises. The object is to fire a self-seeking path to closed allotter controlled link switch 63. However, the diode with the lowest firing potential fires, and the potential on the vertical multiple is applied through the fired diode to lower the potential rising on multiple M1, thus preventing other diodes from firing. Heretofore, this lowest firing potential diode might be diode D1. Thus, a useless search would have been made through intermediate matrix 65 because allotter controlled link contacts 66 are open and no path could be completed thereto. Now, however, this useless search is eliminated because the vertical marking or common reference potential is not connected directly to the vertical multiple bus as taught by the Porter patent. Rather, it is extended through an "OR" gate, such as 68, for example.

In greater detail, when the switching system is originally made, all vertical multiple busses which can extend a path to a link are pre-wired to a common bus energized from that link. The pattern of this pre-wiring provides for inhibiting useless searches. Thus, when an allotter preassigns link #1 to serve the next call, contacts 63 close to mark one end of the cascaded matrices at link inlet 57. Also, contacts 69 close to apply a battery potential to a common originate bus 70. An extension from common bus 70 through "OR" gates 68, 72, 73 applies this battery potential to vertical multiples M2, 74, 75 and every other vertical multiple bus having access to link #1. Thus, when subscriber station 10 goes off-hook, diode D1 cannot fire because link #2 common bus 76 is not energized and no potential is applied through "OR" gate 69′ to vertical multiple bus 77. On the other hand, a diode firing potential does exist between the potential applied via contacts 69, bus 70, "OR" gate 68, and vertical multiple M2 and the off-hook potential applied to horizontal multiple M1. Soon the uninhibited diode with the lowest firing potential (such as diode D) fires and electrically interconnects multiples M1, M2.

If a path can be completed to the marked link, the path is completed. For example, as shown in FIG. 1 the path can be completed over the heavily inked, solid line representing switch path 55 and, therefore, is completed. In actual practice, however, busy markings, or other traffic congestion conditions may be encountered and the path 55 cannot be completed. Thus, while capacitor 79 charges a current flows to hold diode D "on." But, as soon as capacitor 79 is sufficiently charged, diode D starves and switches "off."

The off-hook marking remains on horizontal multiple M1 after diode D switches "off." Assuming, for this description, that all vertical multiples 80 are marked from common bus 70, the next lowest firing potential diode (such as D2) fires and a switching path tries to reach link #1. Of course, all multiples 80 have access to intermediate matrices (not shown) in stage 51. If the path fails to be completed to a link, diode D2 starves for lack of current and switches "off." Then, the next lowest firing potential diode D3 fires and a path tries to reach link #1. The process continues until a path does reach the link, whereupon current flows through contacts 63 to hold the switched diodes "on." The crux of the matter is that the useful selection of diodes D, D2, D3 is left to the mercy of chance, but the useless selection of diode D1 is positively prevented.

If an allotter selects link #2, contacts 81 close to energize common bus 76 and "OR" gates 69', 83, 84. This time contacts 69 are open and diodes D, D2, D3 cannot fire, but diode D1 and many others (not shown) can fire.

To extend the call to a called line, dial tone is returned from link #1, a subscriber dials in a conventional manner, and equipment of conventional design marks the called line. Thus, if line 30, for example, is called, a potential appears at multiple 95 as taught by the Seeman and Haskins co-pending application. Also, contacts 88 close to mark a "thirties" terminate bus and "OR" gate 73. The "OR" gate 90 applies a potential to the vertical multiple busses 91, 92 because calls may be extended from one of the "thirties" lines through either multiple. For example, either diode D4 or diode D5 may be included in a path from lines 30–39 to link #1 outlet 59. In any event, a switch path is extended in the above described manner from marked horizontal multiple 95 to link ground at contacts 96. Is should be noted that both calling and called lines are extended through the matrices to the links in the same one-way direction.

The subscribers may now converse over a path through link #1. This path could include crosspoint diode D, D6, link #1, diodes D7, D4, and D8. Of course, many other paths could have been completed also, since the crosspoint diode selection is purely random and, diodes D2 or D3, and D5 (and many others) could have fired. However, crosspoint diode D9, for example, could not have fired because contacts 98 were not closed and "OR" gate 72 was not energized. Again, the point is that the circuit allows all useful searching through randomly selected crosspoints but inhibits all useless searching.

Thus far in the description, no specific voltages have been assigned to the various potential points. The system does and has functioned properly with a variety of voltages. For example, contacts 69 connect to a small battery indicating circle which is not identified by either a "+" or "—" sign. Also, the direction of current flow through the diodes D is not indicated either.

Now, however, it will be helpful to assign specific voltages and polarities to facilitate explanation of an additional feature of the invention. Although these voltages were actually used in one exemplary system, it should be understood that the invention is not limited thereto. These specific voltages are as follows: the common reference potential, shown in the drawing by a ground symbol, is —18 volts; the marking potential applied to the subscriber lines (as at 10) raises slowly from 0 volts to +18 volts to make full use (within the intermediate stage 51) of the so-called rate-effect firing characteristics of PNPN diodes; and the busy voltage BV of a path previously completed to the input of the secondary matrix is about 0 volts to —4 volts. The voltage rise time to the intermediate matrix caused by the charging characteristics of capacitor 79 is fast relative to the subscriber line marking potential rise time. As the fast rising potential to the intermediate matrix shoots up, the difference between it and the —18 volts reference potential on contacts 63 reaches a firing potential for causing an intermediate matrix diode to fire to. On the other hand, if there is no link ground, no path can fire to the —18 volts reference potential, and under marginal conditions the voltage across a diode may reach a firing potential with respect to the busy voltage BV. Then, a path fires to a busy connection in the secondary stage.

To guard against firing to a busy voltage BV, a guard circuit 105 is connected to the horizontal multiples of each intermediate matrix. The guard circuit 105 is indicated generally at intermediate matrix 65 and in detail at the uppermost intermediate matrix.

The principal guard circuit components are a guard diode GD connected to each horizontal multiple, a number of isolation resistors R and associated capacitors C, and a voltage divider connected between batteries E1, E2. The voltage divider provides a junction potential JV (such as —10 volts) intermediate the common reference voltage —18 volts and the BV busy voltage 0 to —4 volts.

Thus, the potential on capacitor 79 rises to a firing potential relative to the —18 volts link potential so that an intermediate matrix diode fires. If no —18 volt potential is present, the voltage rising on capacitor 79 reaches a potential relative to the junction voltage JV which causes a guard diode GD to fire to that point in guard circuit 105. Current flows to charge capacitor C and hold the fired diode "on." When capacitor C charges and current ceases to flow through the switched "on" diode, it starves and switches "off." As long as the marking potential remains on the subscriber line, other diodes continue to fire until a path reaches a —18 volt link potential. When the marking is removed, the firing ends if no such path is then completed. Traffic studies will, however, enable the use of a sufficient number of diodes wired in a matrix pattern to insure completion of a path to a link before the subscriber line marking is removed. Thus, no switching path can fire to the busy voltage BV.

The details of the electronic logic are not material to the invention. For example, switches 63, 69, 88, 96, 98 etc. may be transistors which switch "on" or "off," and the "OR" gates 69 etc. may use diodes, transistors, or the like. However, FIG. 2 shows a preferred embodiment of an exemplary "OR" gate which functioned well in one system. The "OR" gate includes a vertical multiple M2, a pair of PNP junction type transistors Q1, Q2 connected in common emitter orientation, and a pair of common control conductors 70, 99 extending to the links. Normally, conductors 70, 99 are negative so that transistors Q1, Q2 are "on." Thus, ground G1 appears at point P and vertical multiple M2. If contacts 69 (FIG. 1) close, negative potential is removed from conductor 70; if contacts 100 close, negative potential is removed from conductor 99. In either or both events, the base electrodes of transistors Q1 or Q2 goes to +18 volts applied at resistors 102, 103. When either or both transistors switch "off," point P and multiple M2 goes from the potential at ground G1 to —18 volts applied at resistor 104. This —18 volts is the common reference potential in this particular system.

The presence of ground G1 on vertical bus M2 inhibits all crosspoint diodes connected thereto. The presence of —18 volt battery makes all such diodes uninhibited. Of course, these specific polarities and potentials are cited by way of example only.

The advantages of the system are many. However, it may be helpful to name a few. One advantage is a sharp reduction in the number of paths which can be explored during the self-seeking search. With the two intermediate matrices actually shown, the chances for selection of dead-end paths were 50–50 before the invention. The reduction from this 50–50 chance is important because fewer capacitors, such as 79, are charged and discharged.

Otherwise stray currents could build up charges which distort the desired random pattern of crosspoint firings. Also, the diodes switching "off" and "on," capacitors charging and discharging, etc. could develop into an oscillation through the matrix which conceivably could latch onto a busy marking at the outlet side of a link that is in use. Here the outlet side is inhibited while calls are originating from a calling line to a link. Those skilled in the art will readily perceive many other advantages also.

It is to be understood that the foregoing description of a specific example of the invention is not to be considered as a limitation on its scope.

We claim:

1. An automatic switching system comprising:
a plurality of cascaded matrices, each of said matrices including first and second multiples arranged to provide intersecting crosspoints,
means for simultaneously applying a marking to one multiple in a first of said matrices and to a second multiple in another of said matrices for requesting a switching path from said first multiple through said matrices to said second multiple, there being a first plurality of switching paths which are able to complete connections between said marked multiples and a second plurality of switching paths which are not able to complete connections between said marked multiples,
means responsive to said simultaneous markings for extending self-seeking paths from said one marked multiple to said second marked multiple via randomly selected crosspoints in the first plurality of switching paths,
means comprising enable gates connected to some of said multiples for precluding the selection of crosspoints in said second plurality of paths, and
means responsive to the completion of a first of said paths between said marked multiples for terminating said random selection of crosspoints.

2. An automatic switching system comprising:
a plurality of cascaded matrices, each of said matrices including first and second multiples arranged to provide intersecting crosspoints,
means responsive to a simultaneous marking of a multiple in one of said matrices and a multiple in another of said matrices for requesting a switching search through said matrices in a one-way direction, there being at least some switching paths which could be seized from said marked multiple in said one matrix but which does not extend to said marked multiple in said other matrix,
means for extending self-seeking paths from said marked multiple in said one matrix to said marked multiple in said other matrix via randomly selected crosspoints in said cascaded matrices,
means comprising gate circuits for enabling some of said multiples and for precluding the selection of crosspoints in said same paths, means associated with at least one of said matrices for guarding against the extension of switching paths to busy connections, and means responsive to the completion of a first of said paths between said marked multiples for terminating said one at a time search over said paths.

3. In an electronic switching system comprising a self-seeking, current controlled electronic switching network, having
means for initiating a one-way switching search over self-seeking paths through randomly selected crosspoints in a multi-stage switching network responsive to an application of a potential difference across the ends of said paths, the combination therewith including:
means comprising common busses for selectively controlling the energization of gate circuits for inhibiting the search over some of said paths,
timer means for releasing each of said randomly selected crosspoints in each path which is not completed through said network within the time period measured by said timer, said measured time period beginning for each of said randomly selected crosspoints when said crosspoint is selected, and
means responsive to current flow over a completed one of said paths for holding said one path.

4. In an electronic switching system comprising a self-seeking, current controlled electronic switching network, having means for initiating a one-way switching search over self-seeking paths through randomly selected crosspoints in a multi-stage switching network responsive to an application of a potential difference across the ends of said paths, the combination therewith, including:
means comprising a plurality of "or" gates selectively energized in accordance with the destination of said paths for inhibiting the search over some of said paths,
means for guarding against a search to a busy path,
timer means for releasing each of said randomly selected crosspoints in each path which is not completed through said network within the time period measured by said timer, said measured time period beginning for each of said randomly selected crosspoints when said crosspoint is selected, and
means responsive to current flow over a completed one of said paths for holding said one path.

5. In an electronic switching system comprising a self-seeking, current controlled electronic switching network, having
means for initiating a switching search over self-seeking paths through randomly selected crosspoints in a multi-stage switching network responsive to an application of a potential difference across the ends of said paths, the combination therewith including:
means comprising a pre-wired pattern of connections for inhibiting the search over some of said paths, depending upon the end points of said paths,
timer means for releasing each of said randomly selected crosspoints in each path which is not completed through said network within the time period measured by said timer, said measured time period beginning for each of said randomly selected crosspoints when said crosspoint is selected, and
means responsive to current flow over a completed one of said paths for holding said one path.

6. An electronic switching system comprising:
a plurality of cascaded crosspoint matrices, each of said matrices including a plurality of PNPN diodes for electrically interconnecting circuits at each crosspoint,
means for selectively marking ends of a desired path through the cascaded matrices for requesting a switching search over said crosspoints to establish a connection between said markings, said connections being extended over self-seeking paths through randomly selected crosspoints,
means responsive to a failure to complete a connection over one of said paths for releasing all of said crosspoints in said one path, means for thereafter causing another search over another of said paths responsive through other randomly selected crosspoints, and
means comprising a pre-wired pattern of connections for precluding useless searching over certain paths through said matrices.

7. An electronic switching system comprising:
a plurality of cascaded crosspoint matrices, each of said matrices including a PNPN diode at each crosspoint,
means for selectively marking the ends of a desired path through said cascaded matrices,
means responsive to said marking means for extending connections over self-seeking paths through randomly selected crosspoints, means for releasing all of said crosspoints in said one path if said one path is not completed within a time period, means for causing another search over another of said paths responsive through other randomly selected crosspoints, and means comprising a circuit configuration of pre-wired connections extending from one of said marked ends to said matrices for precluding useless searching over certain paths through said matrices.

8. An electronic switching system comprising:

a plurality of cascaded crosspoint matrices, each of said matrices including a PNPN diode at each crosspoint, means for selectively marking the ends of a desired path through said cascaded matrices, means responsive to said markings for extending connections over self-seeking paths through randomly selected crosspoints, means responsive to the selection of each crosspoint in a self-seeking path for measuring a predetermined period of time and thereafter releasing all of said crosspoints in said one path if said one path is not completed, means for causing another search over another of said paths through other randomly selected crosspoints, means for guarding against seizure of a busy path through said matrices, and means comprising the circuit configuration of said matrices for precluding useless searching over certain paths through said matrices.

9. An electronic switching telephone system comprising:

a plurality of cascaded matrices, each of said matrices including first and second multiples arranged to provide intersecting crosspoints, a semiconductor switching device connected between said intersecting first and second multiples at each of said crosspoints, a plurality of common buses, means responsive to markings applied to some of said common buses for allotting certain of said multiples to serve a request for connections through said matrices, means responsive to the application of a marking voltage to one of said multiples for switching "on" one of the devices connected between said one multiple and an allotted multiple, means for measuring a predetermined period of time after said one device switches "on" and thereafter switching "off" said one device and switching "on" another of said devices connected between said one multiple and another allotted multiple if a path is not completed through said one device, and means responsive to the completion of a path through said matrices for holding said switched device on.

10. The system of claim 9 and means responsive to markings applied to other of said common buses for again allotting some of said multiples, means responsive to a marking voltage applied to another of said multiples for switching "on" the device connected between said other multiple and an allotted multiple, means for measuring a predetermined period of time beginning with the switching "on" of said last named device and thereafter switching "off" said last named device and switching "on" another of said devices connected between said other multiple and another allotted multiple if a path is not completed through said last named device, means responsive to completion of a path through said matrices for holding said switched device "on," and means for interconnecting said two completed paths.

11. An electronic switching telephone system comprising:

a plurality of cascaded matrices, each of said matrices including horizontal and vertical multiples arranged to provide intersecting crosspoints, a semi-conductor switching device connected between intersecting horizontal and vertical multiples at each of said crosspoints, a plurality of subscriber lines, a plurality of link circuits, said lines being connected to individually associated horizontal multiples in one of said matrices and said links being connected to individually associated vertical multiples in another of matrices, a pre-wired pattern of connections extending from said links to said matrices, means responsive to markings applied by a first link to some of said pre-wired connections for allotting certain of said multiples to serve a calling line, means responsive to the application of a marking voltage to one of said multiples by a calling line for switching "on" one of the devices connected between said one multiple and an allotted multiple, means for measuring a predetermined period of time after said last named device switches "on" and thereafter switching "off" said one device and switching "on" another of said devices connected between said one multiple and an allotted multiple if a path is not completed through said one device, and means responsive to the completion of a path from said calling line through said matrices to said first link for holding said switch device "on."

12. The system of claim 11 and means responsive to markings applied from said first link to other of said pre-wired connections for again allotting some of said multiples, means responsive to a marking voltage applied to another of said multiples which serves a called line for switching "on" the device connected between said other multiple and an allotted multiple, means for measuring a predetermined period of time following said switching "on" of the last named device and thereafter switching "off" said last named device and switching "on" another of said devices connected between said other multiple and an allotted multiple if a path is not completed via said last named device, means responsive to completion of a path from said called line through said matrices for switching "off" said last named device and switching "on" another of said devices connected between said other multiple and an allotted multiple, means responsive to completion of a path from said called line through said matrices to said first link for holding said switched device "on," and means in said first link for interconnecting said two completed paths.

13. An electronic switching telephone system having:

a plurality of cascaded crosspoint matrices, a plurality of subscriber lines connected to one side of said cascaded matrices, a plurality of links connected to the other side of said cascaded matrices, some of said crosspoints being included in possible paths between marked points at the ends of said matrices and other of said crosspoints being excluded from possible paths between said marked points, means comprising the configuration of circuits associated with said links for inhibiting said excluded crosspoints, and means responsive to an application of markings to said two marked points for extending self-seeking paths through said matrices and between said marked points via randomly selected uninhibited crosspoints.

14. An electronic switching telephone system having:

a plurality of cascaded crosspoint matrices, each crosspoint comprising a PNPN diode, a plurality of subscriber lines connected to one side of said cascaded matrices, a plurality of links connected to the other side of said cascaded matrices, some of said crosspoints being included in possible paths between marked points at the ends of said matrices and other of said crosspoints being excluded from possible paths between said marked points, means comprising the configuration of circuits associated with said links for inhibiting said excluded crosspoints, and means responsive to an application of markings to said two marked points for extending self-seeking paths between said points via randomly selected uninhibited crosspoints.

15. An electronic switching telephone system comprising:

a plurality of cascaded matrices, each of said matrices including horizontal and vertical multiples arranged to provide intersecting crosspoints, a PNPN semiconductor switching device connected between intersecting horizontal and vertical multiples at each of said crosspoints, a plurality of subscriber lines connected to one side of said cascaded matrices and a plurality of links connected to the other side of said cascaded matrices, there being a plurality of useful paths for extending switch connections through said matrices between any given subscriber line and any link and a plurality of useless dead-end paths through said matrices with respect to any given subscriber line and any link, and means comprising the configuration of circuits controlled from said links for inhibiting all said useless dead-end paths with respect to any given line and the link inhibiting said paths.

16. An electronic switching telephone system comprising:

a plurality of cascaded matrices, each of said matrices including horizontal and vertical multiples arranged to provide intersecting crosspoints, a PNPN semiconductor switching device connected between intersecting horizontal and vertical multiples at each of said crosspoints, a plurality of subscriber lines connected to one side of said cascaded matrices and a plurality of links connected to the other side of said cascaded matrices, there being a plurality of useful paths for extending switch connections through said matrices between any given subscriber line and any link and a plurality of useless dead-end paths through said matrices with respect to any given subscriber line and any link, means comprising the configuration of circuits controlled from said links for inhibiting all said useless dead-end paths with respect to any given line and the link inhibiting said paths, and means comprising a guard circuit connected to the horizontal multiples of at least one of said matrices for precluding the extention calls to busy lines.

17. The telephone system of claim 16 wherein said guard circuit comprises means for terminating and then releasing paths being extended through said matrices.

18. The telephone system of claim 17 and means responsive to the release of said terminated path for extending a different path through said matrices.

19. An electronic switching system comprising:

a plurality of cascaded matrices, each of said matrices including first and second multiples arranged to provide intersecting crosspoints, lines to individually associated ones of said first multiples on one side of said matrices, a plurality of links, means for connecting each of said links to individually associated ones of said second multiples on the other side of said matrices, means in each of said links for extending a common potential via a pre-wired pattern of connections to the second multiples of each cascaded matrix included in certain paths through the matrices to that link, and means responsive to a simultaneous marking of a first multiple in one of said matrices and a second multiple in another of said matrices for initiating a switching search through a plurality of self-seeking paths extended from one of said line side multiples via randomly selected crosspoints marked by said common potential to one of said link side multiples.

20. The system of claim 19 wherein said pre-wired connections include a plurality of buses common to said system and means for selectively connecting said second multiples to said common buses, means for selectively marking certain of said buses with said common potential on a per link basis responsive to the initiation of a call, and means for selectively marking other of said buses with said common potential on a per line basis.

21. An electronic switching system comprising a plurality of end-marked cascaded switching networks, means comprising a plurality of capacitors inside said networks for guiding self-seeking paths searching through said networks, means responsive to currents controlled by said capacitors for releasing said paths if said paths cannot be completed before said capacitors charge, and guard means for releasing the paths which cannot be completed to any end-marking.

22. The system of claim 21 wherein said guard means comprises capacitors connected to one stage of said cascaded network, means responsive to the extension into said network of a path which cannot be completed to an end-marking for charging a capacitor in said guard means, and means responsive to substantial completion of said charging of the capacitors in said guard means for releasing said path which cannot be completed to an end-marking.

23. The system of claim 21 and means whereby said paths are extended between markings having a maximum available potential difference between them, said end-markings comprise first and second relatively widely separated potentials, said first potential marking the start of a path and said second potential marking the termination of a path, means for applying busy markings to the ends of paths which cannot be completed, said busy markings being potentials which are intermediate said first and second potentials, and means for permanently marking a potential point in said guard means with a potential which is intermediate said busy and second potentials whereby paths which cannot reach said second potential are extended to the potential point of said permanent marking instead of said busy marking.

24. The system of claim 23 wherein said means for applying said permanent marking comprises at least one capacitor, means for charging said one capacitor responsive to the extension of a path which cannot be completed to an end-marking, and means responsive to a substantially completed charging of said capacitor for releasing said last named path.

No references cited.

ROBERT H. ROSE, *Primary Examiner.*

WILLIAM C. COOPER, *Examiner.*